US008797558B2

(12) United States Patent
Oeters et al.

(10) Patent No.: US 8,797,558 B2
(45) Date of Patent: Aug. 5, 2014

(54) METHOD, APPARATUS, COMPUTER PROGRAM, AND COMPUTER READABLE STORAGE MEDIA FOR CONFIGURING A PRINTER DRIVER

(75) Inventors: Christoph Oeters, Berlin (DE); Nusret Tasci, Berlin (DE)

(73) Assignee: Sofha GmbH Gesellschaft fur Soft-und Hardware, Berlin (DE)

(*) Notice: Subject to any disclaimer, the term of this patent is extended or adjusted under 35 U.S.C. 154(b) by 444 days.

(21) Appl. No.: 12/715,281

(22) Filed: Mar. 1, 2010

(65) Prior Publication Data
US 2010/0220347 A1 Sep. 2, 2010

(30) Foreign Application Priority Data

Mar. 2, 2009 (DE) .................. 10 2009 010 902

(51) Int. Cl.
*G06F 3/12* (2006.01)
(52) U.S. Cl.
USPC .......... 358/1.13; 358/1.15; 358/1.9; 355/133; 399/82
(58) Field of Classification Search
None
See application file for complete search history.

(56) References Cited

U.S. PATENT DOCUMENTS

| 5,049,929 | A | * | 9/1991 | Anderson et al. ............... 399/82 |
| 5,467,434 | A | * | 11/1995 | Hower et al. ................. 358/1.15 |
| 5,500,715 | A | * | 3/1996 | Ta et al. ............................. 399/1 |
| 5,872,569 | A | * | 2/1999 | Salgado et al. ................ 715/764 |
| 6,182,225 | B1 | * | 1/2001 | Hagiuda et al. ................. 726/19 |
| 6,621,590 | B1 | * | 9/2003 | Livingston ................... 358/1.15 |
| 7,054,022 | B2 | * | 5/2006 | Kazama et al. .............. 358/1.15 |
| 7,139,660 | B2 | * | 11/2006 | Sarkar et al. .................... 701/36 |
| 7,145,688 | B2 | * | 12/2006 | Minagawa ..................... 358/1.2 |
| 7,219,168 | B2 | * | 5/2007 | Koss ................................ 710/16 |
| 7,379,198 | B1 | * | 5/2008 | Ishida .......................... 358/1.15 |
| 7,535,588 | B2 | * | 5/2009 | Wang et al. .................. 358/1.15 |
| 7,707,279 | B2 | * | 4/2010 | Suto ............................... 709/221 |
| 7,872,771 | B2 | * | 1/2011 | Kojima et al. ............... 358/1.15 |
| 7,903,275 | B2 | * | 3/2011 | Ishida .......................... 358/1.15 |
| 7,970,866 | B2 | * | 6/2011 | Kuno et al. .................... 709/219 |
| 8,014,013 | B2 | * | 9/2011 | Owen et al. .................. 358/1.15 |
| 8,107,111 | B2 | * | 1/2012 | Toda ............................. 358/1.15 |
| 8,149,432 | B2 | * | 4/2012 | Kizaki et al. ................. 358/1.15 |
| 8,208,152 | B2 | * | 6/2012 | Hanson et al. ............... 358/1.15 |
| 8,271,703 | B2 | * | 9/2012 | Wang et al. ..................... 710/62 |
| 2001/0029527 | A1 | * | 10/2001 | Goshen ........................ 709/218 |
| 2002/0030848 | A1 | * | 3/2002 | Moriyama et al. .......... 358/1.15 |
| 2003/0112456 | A1 | * | 6/2003 | Tomita et al. ................ 358/1.13 |
| 2003/0126316 | A1 | * | 7/2003 | Parker ............................. 710/15 |
| 2004/0020407 | A1 | * | 2/2004 | Kato ............................ 106/31.6 |
| 2004/0061897 | A1 | * | 4/2004 | Onishi ......................... 358/1.15 |
| 2004/0101326 | A1 | * | 5/2004 | Hoene et al. .................... 399/77 |
| 2005/0060659 | A1 | * | 3/2005 | Verdun et al. ................. 715/772 |
| 2005/0068560 | A1 | * | 3/2005 | Ferlitsch ...................... 358/1.13 |
| 2005/0146732 | A1 | * | 7/2005 | Kizaki et al. ................... 358/1.6 |
| 2006/0023246 | A1 | * | 2/2006 | Vidyanand ................... 358/1.13 |
| 2006/0046686 | A1 | * | 3/2006 | Hawkins et al. .............. 455/403 |
| 2006/0072140 | A1 | * | 4/2006 | Mitani ......................... 358/1.13 |
| 2006/0268306 | A1 | * | 11/2006 | Kojima et al. ............... 358/1.13 |
| 2007/0195335 | A1 | * | 8/2007 | Tanaka .......................... 358/1.1 |
| 2007/0233834 | A1 | * | 10/2007 | Hattori et al. ................. 709/223 |
| 2007/0263236 | A1 | * | 11/2007 | Selvaraj ........................ 358/1.9 |
| 2008/0005192 | A1 | * | 1/2008 | Jung et al. .................... 707/202 |
| 2008/0005294 | A1 | * | 1/2008 | Morris ......................... 709/223 |
| 2008/0037042 | A1 | * | 2/2008 | Furuichi et al. ................ 358/1.6 |
| 2008/0079975 | A1 | * | 4/2008 | Ferlitsch et al. ............ 358/1.13 |
| 2008/0094651 | A1 | * | 4/2008 | Takahashi .................... 358/1.13 |
| 2008/0114847 | A1 | * | 5/2008 | Ma et al. ...................... 709/206 |
| 2008/0165380 | A1 | * | 7/2008 | Lee et al. ..................... 358/1.13 |
| 2008/0204805 | A1 | * | 8/2008 | Ming ........................... 358/1.16 |
| 2008/0246985 | A1 | * | 10/2008 | Patwardhan et al. ........ 358/1.15 |
| 2008/0246988 | A1 | * | 10/2008 | Ashton ........................ 358/1.15 |
| 2008/0259390 | A1 | * | 10/2008 | Murase ........................ 358/1.15 |
| 2009/0040547 | A1 | * | 2/2009 | Ferlitsch ..................... 358/1.15 |
| 2009/0044146 | A1 | * | 2/2009 | Patel et al. ................... 715/808 |
| 2009/0046057 | A1 | * | 2/2009 | Umezawa .................... 345/156 |
| 2009/0180127 | A1 | * | 7/2009 | Yabe ............................. 358/1.9 |
| 2009/0185208 | A1 | * | 7/2009 | Yoshizawa et al. ............ 358/1.9 |
| 2009/0237699 | A1 | * | 9/2009 | Umezawa .................... 358/1.13 |
| 2009/0303528 | A1 | * | 12/2009 | Takeuchi et al. ............ 358/1.15 |
| 2009/0323098 | A1 | * | 12/2009 | Gao ............................. 358/1.15 |
| 2010/0118330 | A1 | * | 5/2010 | Feijoo et al. ................. 358/1.15 |
| 2010/0188688 | A1 | * | 7/2010 | Selvaraj et al. .............. 358/1.15 |

FOREIGN PATENT DOCUMENTS

| DE | 199 22 118 A1 | 11/2000 |
| DE | 698 19 042 T2 | 8/2004 |
| DE | 698 19 049 T2 | 8/2004 |
| EP | 1 431 909 B1 | 2/2009 |

OTHER PUBLICATIONS

Subject Matter Eligibility of Computer Readable Media, David Kappos, US Patent and Trademark Office, Feb. 23, 2010, 1351 OG 212.*

* cited by examiner

*Primary Examiner* — King Poon
*Assistant Examiner* — Ted Barnes
(74) *Attorney, Agent, or Firm* — Christie, Parker & Hale, LLP

(57) ABSTRACT

A method and apparatus for configuring a printer driver where default settings of a printer on which a job is to be printed are queried by a printer driver of a client computer. The default settings can be, for example, stored in the printer itself, or in a storage medium or in a database in some other location that is accessible to the client computer. Depending on the default settings of the printer, default settings of the driver are configured.

19 Claims, No Drawings

METHOD, APPARATUS, COMPUTER PROGRAM, AND COMPUTER READABLE STORAGE MEDIA FOR CONFIGURING A PRINTER DRIVER

CROSS-REFERENCE TO RELATED APPLICATION

This application claims to and the benefit of German Patent Application Number 10 2009 010 902.1, filed on Mar. 2, 2009, the entire content of which is incorporated herein by reference.

AREA OF THE INVENTION

The invention is related to a method and an apparatus for configuring a printer as well as a corresponding computer program and corresponding computer-readable storage media, which are in particular applicable in network printing where a number of client computers is connected with at least one network printer. By means of this invention, in particular default settings do not have to be adjusted individually for each client computer by an administrator, but can be set centrally. Further, the invention provides an improved opportunity to customize the printer driver's user interface.

TECHNICAL BACKGROUND

Conventional digital printers and copiers allow print jobs to be transmitted from a client PC over a network or other communication connections to such printer or copier. (In the following, the term "printer" shall be used for digital printers and digital copiers.) Professional printers allow the user selecting a multitude of settings, e.g. input tray, paper size, or finishing options. This selection is performed in a printer driver which is called when the user attempts to submit a print job from an application on the client PC. Settings like the input tray can be selected for the whole print job or individually for each page. When the printer driver sends the print job to the printer, the data in the print job comprise also the instructions corresponding to the settings selected by the user.

Modern printer drivers provide a number of user selectable settings. Such settings can be e.g. input tray settings, finishing settings as staple, punch, and fold as well as screening settings, i.e. settings specifying how to represent grey or color values by the printer.

Although conventional printer drivers allow combining many settings, not all theoretically possible combinations are valid. For example, long edge stapling and short edge punching are not simultaneously possible for mechanical reasons and are therefore restricted.

Modern printer drivers recognize restricted combinations and output a warning and/or suggestions for allowed alternative combinations. The identification of restricted combinations and the optional suggestion of valid alternatives is known by the term 'constraints'.

Various constraints depend on the mechanical configuration of the printer. E.g., if the printer is not equipped with a staple or punch device, the corresponding settings are not allowed.

Modern printer drivers contain a logic to query such mechanical configurations. Depending on the results of such a query the printer drivers tailor the user interfaces to the constraints. Such a query can be done via a network, e.g. using the Simple Network Management Protocol (SNMP).

Modern printer drivers further provide the possibility to use default settings. Default settings determine the properties of the printer driver and the settings of the printer, as long as no different user-defined selection was made. If e.g. a printer supports resolutions of 600 dpi or 1200 dpi, one of them must be set as default, if no user-specific other selection was made.

Default settings are a part of the driver software. They are defend after the installation, but can be changed by the user afterwards. The definition of defaults minimizes the risk of errors and increases the reliability of the print workflow.

High volume printers are commonly used in networks with a high number of users. Companies providing such printer networks usually prefer their own default settings which are to be applied by all users. Although it is possible to adjust these default settings on each client computer individually, this takes time and is therefore expensive. It would be desirable for an administrator to determine these central settings in a simple way for all client computers. Existing solutions do not provide this possibility.

As mentioned, settings may depend on constraints. E.g. the tone curve, i.e. the curve defining how greyscales are printed, may be defined differently for each resolution. A resolution of 600 dpi may require a curve A whereas a resolution of 1200 dpi requires a different curve B. A disadvantage of existing solutions is the necessity for the user to set these combinations limited by constraints manually.

The German patent application DE 698 19 049 T2 describes a method for managing network devices including access control. However, it does not describe receiving information from a printer and configuring a printer driver correspondingly.

The European patent application EP 1 431 909 B1 describes a method for setting parameters in a printer. However, it does not describe receiving parameters from a printer and performing corresponding settings on the client PC.

The German patent application DE 199 22 118 A1 describes the use of executable files on a network server which can be used by a client to configure the network server. As this method assumes web browser or similar technology, it cannot be used in a printer driver.

TASK OF THE INVENTION

The present invention therefore has the task to provide a method and an apparatus for the configuration of a printer driver as well as a corresponding computer program and corresponding computer-readable storage media which lift the mentioned disadvantages and allow increasing the reliability of printer networks by automatic consideration of constraints.

DESCRIPTION OF THE INVENTION AND ITS ADVANTAGES

A particular advantage of the method according to the invention is the fact that default settings for printer drivers can be centrally defined by an administrator which can then be used by the client computers connected to the network printers. Thereby, particularly erroneous and/or contradicting configurations of printer drivers are avoided.

This is achieved by a printer driver installed on a client computer querying, after its installation, the defaults of the target printer. Particularly, the invention is usefully applied in the use of network printers. These default settings can, e.g. be stored in the network printer itself or in a storage medium or in a database in some other location that is accessible to the client computer. The default settings obtained by the query are evaluated, and the printer driver is configured accordingly. It turns out to be advantageous to run a consistency test for the default driver settings after the query, but before the configuration. A query for the default settings and/or the printer driver configuration can be executed either automatically, during the installation process or on opening the printer driver, or can be launched by user interaction.

In a preferred embodiment of the invention the settings comprise higher level and lower level (default) settings. In the following, the term 'higher level' describes settings which can be set independently of other settings. For example, resolution can be such a higher level setting. On the other hand, 'lower level' settings are those which are affected by other settings, in particular higher level settings, and cannot be set independently. Lower level settings are, e.g. screening method, screen frequency, screen angle, dot shape, tone curve etc. These settings which are provided as an example are in particular dependent on the higher level setting 'resolution'.

In a preferred embodiment of the invention the settings are arranged hierarchically. E.g. low level (default) settings can be stored in a hierarchy level below the higher level settings on which they depend. By this, for each higher level setting, the corresponding lower level settings are stored. Further, for each possible value of a higher level setting, a set of (default) values of the lower level settings is stored.

Such a hierarchical arrangement of settings can be achieved, e.g. by placing informations about the settings into a database as so-called managed objects, which can be queried via a network management protocol. An example of such a network management protocol is the Simple Network Management Protocol (SNMP). The informations about the settings then can stored as managed objects in a so-called management information base (MIB). Preferably the managed objects are stored hierarchically in a tree structure. It turns out to be particularly advantageous if the (default) settings are stored in private modules of a MIB.

Because some settings, as mentioned, mandatorily require specific default settings, it turns out to be advantageous if at least for a part of, but preferably for all of the higher level settings the different values of these higher level settings are provided together with the values for the corresponding lower level settings, e.g. in the printer used for printing, in response to a query from the printer driver.

In a further preferred embodiment of the invention the printer driver queries all settings from the printer to be used, and stores the different values of the higher level settings together with the corresponding default values of the lower level settings on the local client computer. At least for a part of the higher level settings, but preferably for all higher level settings, a set of lower level default settings is provided in a preferred embodiment of the invention. It turns out to be advantageous if on defining the higher level settings, the corresponding lower level default settings are defined as well. In that case the printer driver may check which lower level settings of the just changed higher level settings were left unchanged as defaults and which lower level settings were changed to user-defined settings in the previous configuration of the printer driver. Preferably only those lower level settings which were left unchanged (default) before will be changed to the defaults of the new values for the changed higher level setting. By preference, only such lower level settings are changed to the default settings for the new value of the changed higher level setting which have been left on their standard value before. User-defined lower level settings are not necessarily replaced by default settings. In this case a compatibility test may be performed and an error message may be output where appropriate.

In a further preferred embodiment of the invention the printer driver stores the user-defined lower level settings for each value of the higher level settings separately. When the higher level settings are changed, the printer driver can then set the values of the lower level settings to the most recent user-defined values, as long as these values were not left default.

An apparatus according to the invention contains at least a computer chip and/or processor and is configured such that a printer driver configuration method can be executed where the printer driver queries default values from the target printer and depending on the default values configures default printer driver settings on the client computer.

A computer program for the configuration of a printer driver enables a computer, after it has been loaded into the computer memory, to execute a method for configuring a printer driver, where the printer driver queries default values from the target printer and depending on the default values configures default printer driver settings on the client computer.

In a further preferred embodiment of the invention, the computer program according to the invention is constructed out of modules, where individual modules are installed on different computers. For example a first module can be installed on a client computer where the printer driver is installed, and a second module can be installed in the printer.

Other embodiments provide additional computer programs by which further steps or workflows listed in the description can be executed. Such computer programs can be provided, e.g. downloadable in a data or communication network (against charge or free, freely accessible or password protected). The computer programs provided this way can then be made usable by a method where a computer program according to claim 17 is downloaded from an electronic data network, e.g. the Internet to a computer connected to the data network.

To execute the method for configuring a printer driver according to the present invention, a computer readable storage medium shall be used on which a program is stored which enables a computer, after it has been loaded into computer memory, to execute a program for configuring a printer driver where the printer driver queries default values from the target printer and depending on the default values configures default printer driver settings on the client computer.

A particular advantage of the invention is that a mechanism is provided by which standard settings of a printer can be queried. This approach in particular includes the retrieval of such defaults which depend on other settings. The invention in particular allows companies in an advantageous way to predefine default settings to a printer, especially to a network printer and provide these settings to the client computers. This method reduces in particular the risk of wrong print results and simultaneously increases the productivity of the print workflow in companies. By providing different default settings for different configurations, the flexibility and efficiency of print processes is increased and simultaneously optimum print results are achieved.

EXECUTION EXAMPLE

In the following, the invention shall be described using sample default settings. It should be noted that the invention is not limited to the example described in the following, but also comprises other procedures, arrangements, computer programs and computer-readable storage media for the execution of a printer driver configuration method using settings, data structures, and communication protocols different from those mentioned in the example, or storing the available default settings in a different location, as long as they implement the features of the invention defined in the claims.

In a sample arrangement a client computer is connected to a printer via a bi-directional communication channel, e.g. Ethernet. Depending on the connection settings at the printer port of the operating system the printer driver can establish the bi-directional connection with the printer, even if the actually used printer port allows only uni-directional communication.

In a sample embodiment the printer driver communicates with the printer via the SNMP protocol as defined in RFC 3411 to RFC 3418. At certain times the printer is queried by the printer driver via the SNMP protocol. This is done preferably after the first installation of the printer driver on the client computer, on opening the printer driver, or additionally by a query initiated by the user.

The SNMP protocol represents object information in a tree structure. In each tree level the nodes of the tree are numbered (Object Identifier, OID). Thus, each information can be accessed by identifying the corresponding node by its specific sequence of numbers. Information provided by the SNMP protocol depends on the device type. A part of the information provided by SNMP is stored in so-called specific management information bases (MIB). Some vendor-specific information is stored in so-called private MIBs.

Default Settings

In a sample embodiment of the invention the default settings of the printer are provided in private MIBs of the SNMP protocol, which was extended accordingly. For selected settings additional entries were added to the private MIBs, and default settings were entered for these entries.

A printer driver of a sample embodiment comprises a function called "Acquire Printer Defaults", allowing to obtain the defaults of the printer. If this function is invoked by the user, the printer driver initiates a query towards the printer to obtain its default settings. After receiving the answer from the printer, the printer driver sets the value for each queried setting to the (default) value obtained from the printer. In some cases the default values may be inconsistent with a part of the other settings of the printer driver. Therefore, in a sample embodiment a consistency test is performed by the printer driver, checking if the constraints required by some settings are fulfilled.

In a sample embodiment of the method according to the invention a message is shown to the user indicating if the settings were applied successfully or not. If the default settings were queried successfully from the printer, a message is shown to the user whether the actual settings of the printer driver are adequate for the selected higher level settings.

Higher Level and Lower Level Settings

Regarding the consistency of the settings for printer drivers, a second aspect of the invention is important. The settings are extended by a new attribute as mentioned above—'higher level' and 'lower level'. In this case, higher level settings are settings which can affect others, the lower level settings. If the value of a higher level setting was changed, it may be necessary to change values of the other, lower level, settings depending on the higher level setting. Thus, lower level settings are settings whose defaults depend on another setting to which they are related.

For example the resolution can be designed as a higher level setting, causing dependencies for the following settings: screen method, screen frequency, screen angle, dot shape, tone curve. The last-mentioned settings are subordinate related to the setting 'resolution'.

In a special embodiment of the invention, in this case a set of default settings is stored in private modules of the MIB for each available resolution value. This leads to the following entry hierarchy:

Default value, independent of other settings, i.e. higher level setting: Resolution.

The different values for resolution provided by the printer are stored in one hierarchy level, e.g. 600 dpi (dots per inch), 1200 dpi.

For each of these resolution values, in a subordinate hierarchy level the corresponding values of the lower level default settings are stored, e.g.:

For 600 dpi: screen_method_600, screen_frequency_600, screen_angle_600, dot_shape_600, tone_curve_600.

For 1200 dpi: screen_method_1200, screen_frequency_1200, screen_angle_1200, dot_shape_1200, tone_curve_1200.

Out of these default settings, in particular the screen frequencies will be different for each resolution, because a higher resolution assumes a higher screen frequency. E.g. the screen frequency for a resolution of 1200 dpi may be 133 lpi (lines per inch) whereas the screen frequency for 600 dpi may be 100 lpi. Further also different tone curves may be provided as default depending on the resolution.

If a user invokes the function "Acquire Printer Defaults", the printer returns several sets of default settings. In the example above, it returns a first set of default settings for a resolution of 1200 dpi, and a second set of default settings for a resolution of 600 dpi.

The printer driver stores these different sets of default settings depending on the higher level setting (here: resolution) locally after receiving them from the printer.

If the user changes one of the higher level settings (e.g. resolution), the printer driver queries the lower level settings of the old value of the higher level settings. If still the default values are set there, they are replaced by the default values corresponding to the new value of the higher level setting. Otherwise apparently the old default values have been changed by the user, and the printer driver leaves these values unchanged. If necessary, a message about an invalid configuration is output.

As a consequence, after a change of a higher level setting, all values of lower level settings which have not been changed by a user to non-default values are set to the new default values. All other values are kept, as far as the combination of the settings is valid.

The invention is not limited in its embodiment to the preferred execution examples mentioned above. Rather a number of variants can be envisioned which use the set-up and method of the invention even with basically different embodiments.

The invention claimed is:

1. A method for configuring a printer driver with settings, the method comprising:
   storing at least values which are assignable to the settings, wherein:
   each setting is composed of a name and an assigned value;
   each setting causes defining a configuration of the printer driver;
   at least a part of the settings is defined as default settings having default values; and
   the settings comprise first level settings and second level settings arranged hierarchically so that the second level settings are subordinate to the first level settings, wherein a change of value of one of the first level settings automatically triggers a change in value of a plurality of the second level settings, but a change in value of one of the plurality of second level settings does not trigger a change in value of the one of the first level settings;

querying by the printer driver default settings of a printer on which a job is to be printed; automatically configuring default settings of the printer driver based on the default settings of the printer, wherein default values assigned to the second level settings are configured consistent to default values assigned to the first level settings;

receiving by the printer driver a first default value for the one of the first level settings;

automatically, depending on consistency requirements, assigning by the printer driver second default values to the plurality of second level settings in response to receiving the first default value;

receiving by the printer driver a third value as change in the first default value for the one of the first level settings; and automatically, depending on consistency requirements, assigning by the printer driver fourth default values to the plurality of second level settings in response to the change in the first default value.

2. The method according to claim 1, wherein the queried printer provides the default settings to the printer driver.

3. The method according to claim 1, wherein the querying is performed via a printer port of a computer on which the printer driver is installed.

4. The method according to claim 1, wherein the querying is performed via a network management protocol.

5. The method according to claim 1, wherein the default settings are provided in private modules of a management information base.

6. The method according to claim 1 further comprising:
performing a consistency test by the printer driver before configuring the default settings of the printer driver, wherein the consistency test covers the default values of the plurality of second level settings corresponding to each of the first level settings.

7. The method according to claim 1 further comprising:
configuring the second level settings compatible with the first level settings after configuring the one of the first level settings.

8. The method according to claim 1 further comprising:
providing default values for the plurality of second level settings for each combination of default values of the first level settings.

9. The method according to claim 1 further comprising:
locally storing by the printer driver default values of the first level settings together with corresponding default values of the plurality of second level settings.

10. The method according to claim 1, wherein in response to receiving by the printer driver the third value as change in the first default value for the one of the first level settings, refraining from automatically assigning a corresponding default value to a second one of the plurality of second level settings in response to determining that the second one of the plurality of second level settings is assigned a user-defined value.

11. The method according to claim 10, wherein the job is printed with settings modified by the printer driver.

12. The method of claim 10, further comprising:
determining by the printer driver that the user-defined value is inconsistent with the third value assigned to the one of the first level settings; and
providing an alert in response to the determining.

13. The method according to claim 1 further comprising:
locally storing default values of the first level settings together with corresponding default values of the plurality of second level settings configured by a user.

14. The method according to claim 13 further comprising:
during configuration of a particular one of the first level settings, configuring by the printer driver corresponding ones of the plurality of second level settings assigned by the user for a corresponding value of the particular one of the first level settings.

15. The method according to claim 13, wherein the job is printed with settings modified by the printer driver.

16. The method according to claim 1, wherein the values of the first level settings are configured to be set independent of other settings, and the values of the second level settings depend on the values of the first level settings.

17. The method according to claim 1, wherein the values of the first level settings dictate at least one first behavior of the printer and the values of the second level settings dictate at least one second behavior of the printer.

18. An apparatus comprising:
a processor; and
a memory coupled to the processor and storing computer program instructions therein, the processor being operable to execute the computer program instructions, the computer program instructions for configuring a printer driver according to the method of claim 1.

19. A non-transitory computer readable storage media on which a program is stored for execution by a computer, after it has been loaded into a memory of the computer, the program adapting the computer to configure a printer driver according to the method of claim 1.

* * * * *